No. 717,058. Patented Dec. 30, 1902.
J. WALSH, Jr.
NUT LOCK.
(Application filed Mar. 26, 1902.)
(No Model.)

WITNESSES:
N. W. Robbins.
R. F. Gamble.

INVENTOR:
James Walsh Jr
BY A. V. Groups
ATTORNEY

UNITED STATES PATENT OFFICE.

JAMES WALSH, JR., OF PHILADELPHIA, PENNSYLVANIA.

NUT-LOCK.

SPECIFICATION forming part of Letters Patent No. 717,058, dated December 30, 1902.

Application filed March 26, 1902. Serial No. 100,006. (No model.)

*To all whom it may concern:*

Be it known that I, JAMES WALSH, Jr., a citizen of the United States, residing at Philadelphia, in the county of Philadelphia and State of Pennsylvania, have invented certain new and useful Improvements in Nut-Locks, of which the following is a specification.

The object of this invention is to provide an improved nut-lock that may be applied to bolts and nuts of every description.

The invention consists in the employment of a washer provided with projecting teeth which are so arranged on the washer as to constitute an effective locking device, as will hereinafter more fully appear.

Figure 1:
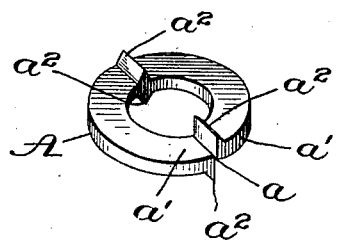
Figure 2:
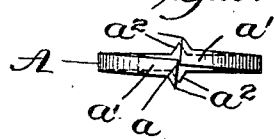
Figure 3:
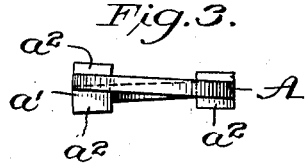
Figure 4:
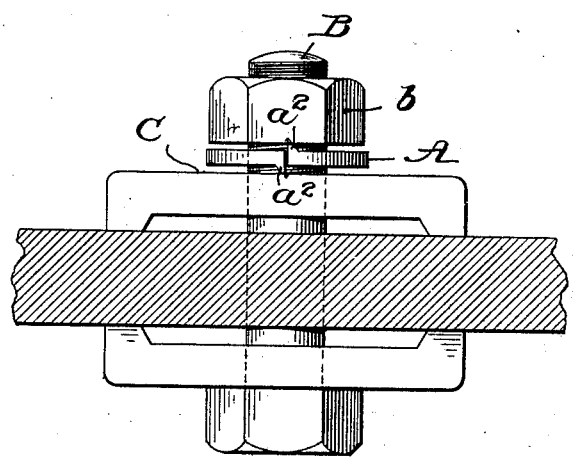

In the drawings, Figure 1 is a perspective view of my improved nut-lock. Fig. 2 is an edge view thereof. Fig. 3 is an edge view as seen at right angles to Fig. 2. Fig. 4 is a view of the device as in use.

A is a washer, which may be constructed of steel or any suitable material. This washer is split, as at $a$, and the free ends $a'$ are bent slightly away from each other, so as to constitute a spring, as shown. The washer is provided with oppositely-disposed projecting teeth $a^2$, which are arranged on a radial line passing through the center of the washer and directly opposite each other on the respective faces of the washer. Referring to Fig. 4, it will be seen that by applying this washer to a bolt B, between the nut $b$ thereon and the opposing surface C, and then screwing the nut home, the free ends $a'$ of the washer are brought together on the same plane, and the teeth $a^2$ embed themselves in the opposing nut $b$ and surface C. After the nut has been screwed home, as above described, the nut and surface contact with the washer only at points on a radial line passing through the center of the washer A and bolt B. This I have found to constitute an effective lock, as any movement of the bolt causes a rocking action of the nut $b$ and washer A upon the teeth $a^2$, thereby embedding said teeth still deeper in the nut $b$ and surface C and avoiding any liability of the accidental unscrewing of the nut.

I claim—

A nut-lock comprising a plane washer provided with two diametrically-opposite pairs of teeth whereof those of each pair are on the respective faces of the washer and directly opposite each other, said washer being split on a radial line intersecting one of the pairs of teeth, substantially as described.

In testimony whereof I affix my signature in presence of two witnesses.

JAMES WALSH, JR.

Witnesses:
R. HARRY GAMBLE,
ANDREW V. GROUPE.